United States Patent [19]
Hines et al.

[11] 3,757,313
[45] Sept. 4, 1973

[54] DATA STORAGE WITH PREDETERMINED SETTABLE CONFIGURATION

[75] Inventors: Herbert W. Hines; Leon C. Radzik, both of Raleigh, N.C.

[73] Assignee: International Business Machines Corporation, Armonk, N.Y.

[22] Filed: June 29, 1972

[21] Appl. No.: 267,730

[52] U.S. Cl. .............. 340/173 R, 307/238, 307/291, 340/173 FF, 340/173 LI

[51] Int. Cl. .............................................. G11c 11/40

[58] Field of Search .................. 340/173 R, 173 CP, 340/173 FF; 307/291, 238, 279

[56] References Cited

UNITED STATES PATENTS 3,618,052 11/1971 Kewl .............................. 340/173 LI 3,662,351 5/1972 Ho et al. ......................... 340/173 LI

*Primary Examiner*—Terrell W. Fears
*Attorney*—Delbert C. Thomas et al.

[57] ABSTRACT

A random access memory matrix with word and bit access is modified to supply operating power in stages to set the memory to a preselected pattern. Each bit cell of the memory is powered by two power leads with each half of the cell connected to a different one of the leads. The supply of power to only one half of the cell will bias the circuits so that when the other half of the power supply is provided, the cell will always turn on in a predetermined configuration. Selection of one or another connection type for each bit cell will turn on the memory to give an initial load of preselected data.

Two additional configurations giving two or three selectively settable initial loadings are shown.

6 Claims, 4 Drawing Figures

FIG. 2
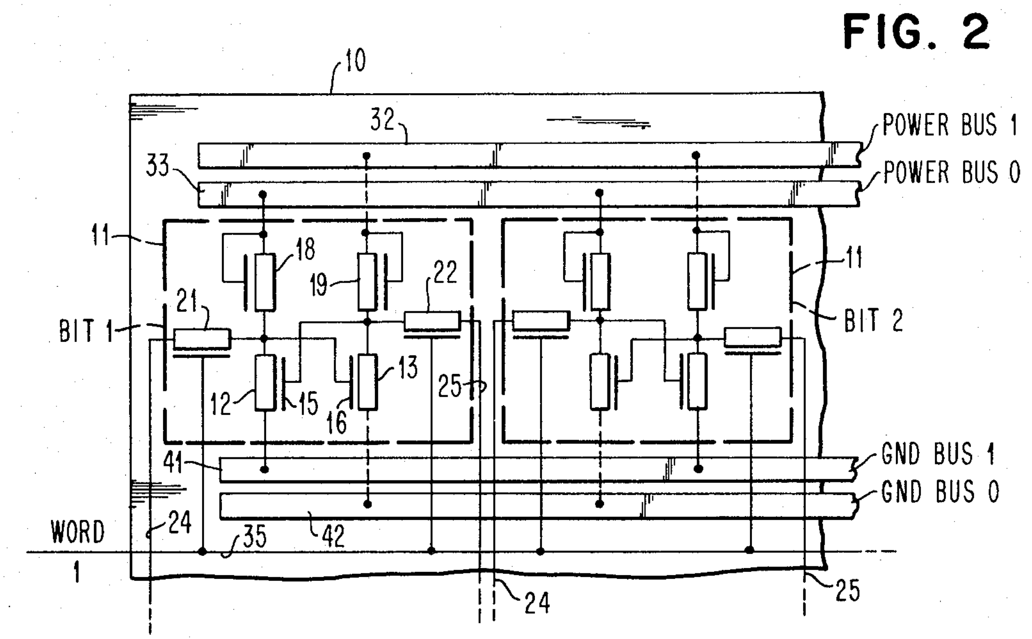
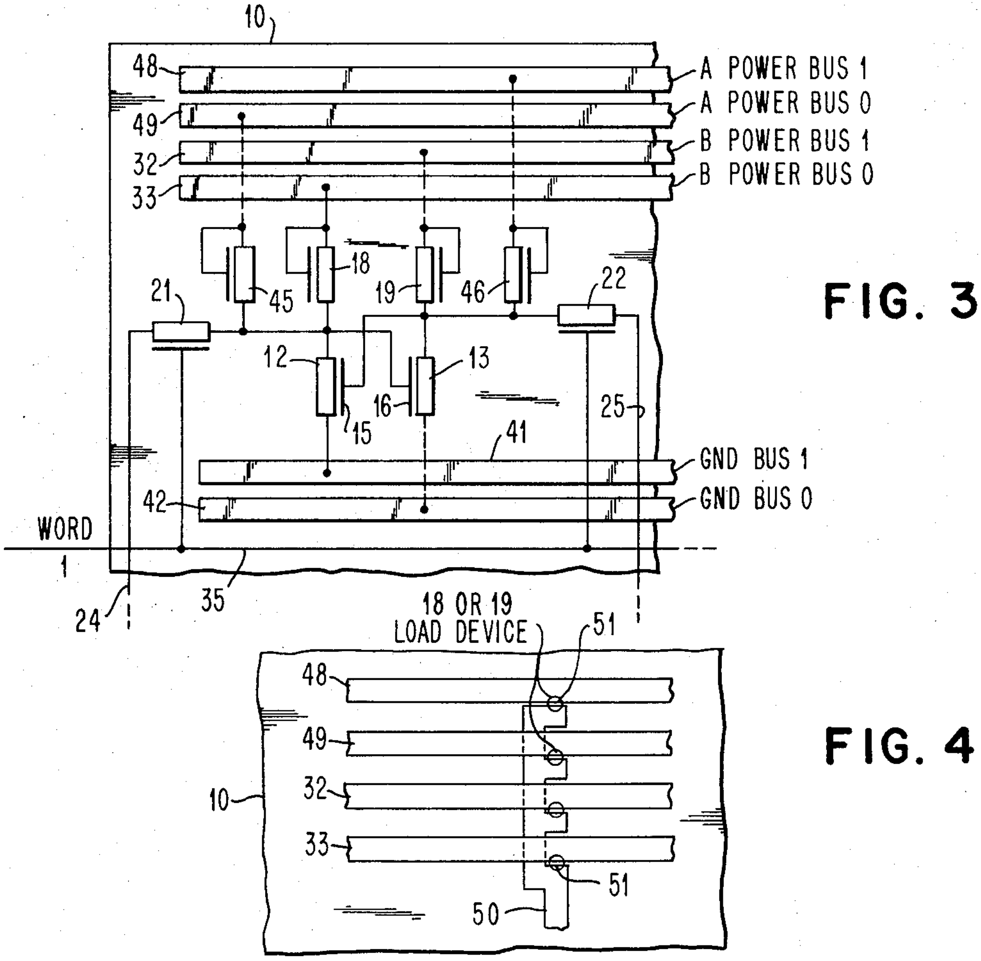
FIG. 3
FIG. 4

DATA STORAGE WITH PREDETERMINED SETTABLE CONFIGURATION

BACKGROUND OF THE INVENTION

This invention relates to an information storage unit which will assume a predetermined configuration when turned on but which will function thereafter as a randomly addressable read-write memory. Storage units of this type are already known and were suggested by the random pattern assumed by the cells of the storage when first brought into use. It was found that the patterns were usually the same and were caused by minor differences between the two parts of a cell which caused one part to be more favored for starting. Prior disclosures have emphasized the differences in attempts to provide a preloaded data set, but have not been uniformly successful since the differences introduced between the parts of a cell tend to render the cell unreliable, slower, or substantially larger than is otherwise required.

OBJECTS OF THE INVENTION

It is an object of the invention to provide a random access storage device with a powering system which is operable to force the device into a preselected stored data pattern.

It is also an object to develop a storage device having bistable state bit storage cells with a biasing system to enable a preselected storage pattern to be set into said cells.

A further object is to provide such a storage device in which the bit storage cells are comprised of two similar inter-connected cell halves but with each half of the cell being connected to a different power supply.

Still another object is the provision of a storage device which can be reset to an initial data storage pattern by supplying power to only one part of each bit storage for a short interval and then applying power to the remainder of the device.

A still further object is the provision of a storage device having two preselected storage patterns built in for selective initial use prior to utilization of the device as a read-write storage.

Other objects, features and advantages of the invention will be apparent from the following description of a preferred embodiment of the invention, as illustrated in the accompanying drawings.

BRIEF DESCRIPTION OF THE DRAWINGS

In the drawings

FIG. 2 is a diagram of a section of a storage matrix as in FIG. 1, but modified to enable two preselected storage patterns to be loaded;

FIG. 3 is a detail similar to FIG. 2, but including a third input for presetting the matrix; and FIG. 4 is a detailed view showing one way in which the selective power connections can be made.

DESCRIPTION OF THE PREFERRED EMBODIMENT

Figure 1:
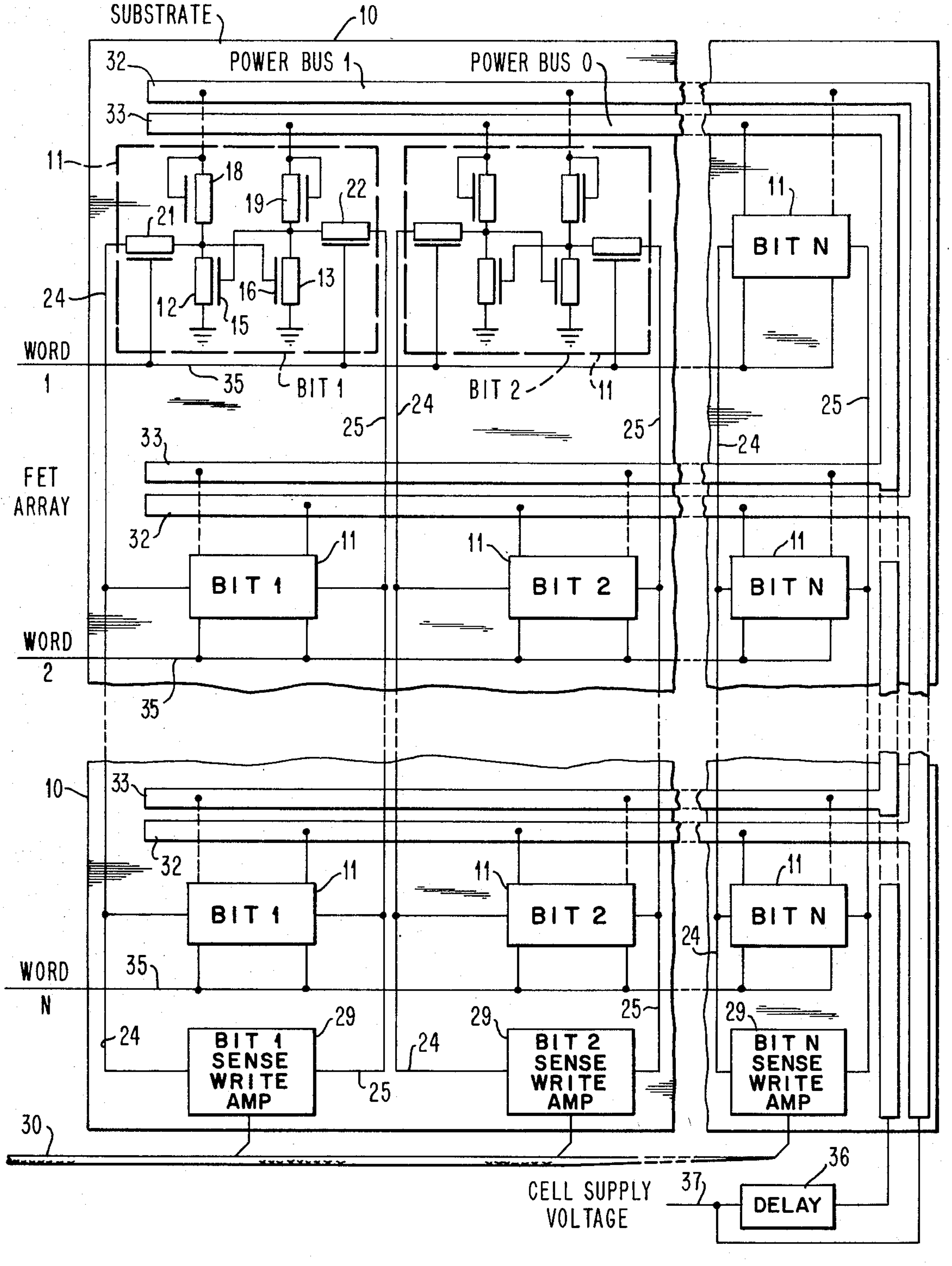
FIG. 1 is a diagrammatic showing of a storage matrix containing the features of the invention.

The preferred embodiment of the invention is shown in FIG. 1 as it is embodied in a storage chip having a plurality of data bit storage locations thereon in a rectangular matrix formation. The chip comprises a substrate 10 having a plurality of bit cells 11 therein, as is now conventional for storage units.

Each bit cell comprises a bistable state unit having six transistors of the IGFET type. Transistors 12 and 13 each have their source terminals connected to a ground level voltage terminal and each of their gates 15 and 16 respectively are connected to the drain of the other transistor. Each drain is also connected through a transistor 18 or 19 acting as a load device to a source of power. The gates of each of the transistors 18 and 19 are directly connected to their respective drain terminals.

A sensing/driving transistor 21 or 22 has its source connected to the junction between transistors 12 and 18 or 13 and 19 respectively. The drains of all transistors 21 which are in a column of bit cells 11 are connected to a common lead 24 and those of transistors 22 are similarly connected to a common lead 25. The gates of all transistors 21 and 22 for all of the bit cells of a row are connected to a common word line. A sense/write amplifier 29 is connected to each pair of wires 24 and 25 for the column of bit cells 11 and sense or drive the individual wires of a cable 30 for read or write operations. The amplifiers 29 are conventional units already in use for storage applications of this kind and serve to detect or supply voltage to one or the other of the leads 24 and 25. In view of their conventional nature, it is not believed necessary to further describe these units.

Power for operation of the storage device is provided by two power leads 32 and 33 and the drain-gate of transistor 18 will be connected to one or the other depending on whether or not it is desired to have an initial setting of "one" or "zero" in the bit cell 11. The drain of the other transistor 19 of the cell is connected to the remaining one of the power leads 32 or 33.

In operation, power will be supplied to one, here assumed to be lead 32, of the voltage leads to bias the cell to a preselected state. As shown, when lead 32 is powered, transistor 18 is rendered conductive to apply voltage to the drain of transistor 12 and to the gate 16 of transistor 13. Since transistor 19 is not conductive, gate 15 and the drain of transistor 13 receive no voltage and neither transistor will be conductive although transistor 13 will be gated on. Now, when bus 33 receives voltage, transistor 19 becomes conductive and current will flow through transistor 13 which was gated on. The voltage at its drain will not rise above the threshold level needed for conduction and this will hold the gate 15 of transistor 12 at an ineffective level. Thus, transistor 13 will always turn on whenever the power is supplied in the above sequence. If it is desired to have transistor 12 turn on at the initial powering, the connections of transistors 18 and 19 to power leads 32 and 33 are reversed so that transistor 19 is first rendered conductive.

When it is desired to read the value stored in a bit cell 11, the word wire 35 for the cell is given a voltage to turn-on the gates of the transistors 21 and 22 so that the lead 24 or 25 connected through transistors 21 or 22 to the higher voltage one of the junctions between transistors 12 and 18 or between 13 and 19 will receive a signal voltage, and this will control the amplifiers 29 to put the voltages rePresenting the read out word on the wires of cable 30.

To set the bit cell to a new value, the appropriate word line 35 is raised to gate transistors 21 and 22 and simultaneously the bit sense amplifier will put a low voltage on one of the lines 24 and 25 depending upon the digit to be stored in the cell. If transistors 19 and 16 are conducting, then their junction is at the conduction drop across transistor 13. A low voltage (ground) on line 25 will not change the voltage at the junction and would not change the state of the cell since the cell is already at the desired state. If, however, line 24 is connected to the low voltage, the junction of transistors 12 and 18 will drop to the conducting voltage and this will drop the voltage of gate 16 to turn off the conducting transistor 13. Now the junction of transistors 13 and 19 rises to put a gating voltage on gate 15 and start conduction in transistor 12, thus reversing the original conducting states. The same sequence will occur to transfer conduction from transistor 12 to transistor 13 by grounding line 25.

To supply the power to lead 32 first and then to 33 in a proper sequence, a delay 36 is interposed between lead 33 and the supply voltage lead 37 to which lead 32 is directly connected. The delay can be of any conventional type which will delay application of voltage to lead 33. A relay circuit can be used, but since the setting time of a bit cell will normally be in the microsecond or less range, it will be obvious that much faster operating circuits can also be used to enable the initial setting.

MODIFIED CIRCUITS

In modern processors, there are many types of fixed data which can be initially loaded into the system. Examples of these are an initial program load to start a processor operating, tables of constants, diagnostic routines to determine system failures and the like material. FIG. 2 shows a modification of the structure of FIG. 1 which can be set to either one of two different storage configurations, for example, an initial program to start a processor working and a diagnostic program to test the processor. In each case, the initial setting is used once and after use, the storage space can be released for data storage. In FIG. 2, the bit cell 11 is identical to that of FIG. 1 with the exception that the ground connections of transistors 12 and 13 are made to different ones of a pair of ground buses 41 and 42. To obtain a first pattern, the two ground leads are connected together and power is applied to leads 32 and 33 in sequence as above. The bit cell operation is as set out above. The second preselected storage pattern is provided by connecting both of the power leads 32 and 33 to power before either ground lead is connected. Now, both transistors 18 and 19 will be conductive but only the transistor 12 or 13 connected to the first one of leads 41 or 42 to be grounded will conduct, and this will prevent conduction of the other transistor 12 or 13 when the second one of leads 41 or 42 is grounded. This will set the storage to the second selected pattern.

If it is desirable or necessary to have a third or more storage pattern selectively settable, this may be done by a modification as in FIG. 3. Here, the bit cell is modified to include two additional transistors 45 and 46 having their sources connected to the sources of transistors 18 and 19 respectively. A pair of power leads 48 and 49 are added and the drains and gates of transistors 45 or 46 are selectively connected in the same manner as set out above for transistors 18 and 19. In this modification, the first and second storage patterns will be set as in the FIG. 2 description and the third pattern will be set by sequential powering of leads 48 and 49 in the same manner as for leads 32 and 33. Removal of power from leads 38 and 39 is necessary when using leads 48 and 49. It will be readily apparent that if further initial patterns are needed, an expansion of the bit cell 11 as indicated in FIG. 3 can be made although the multiplication of the necessary power leads rapidly renders the design uneconomical for larger configurations.

It should be noted that in some instances a lead is shown in dotted lines in the figure. This does not indicate a break in the lead, but is intended to represent an insulating layer to separate two crossing conductive areas of a substrate.

FIG. 4 shows one conventional method which can be used to make the selective connections between a drain of a transistor and any one of the four power leads 32, 33, 48, and 49 of FIG. 3. The drain 50 will be a heavily doped conductive area of the substrate 10 and will be then covered with an insulating layer of, say, silicon dioxide or the like. A hole 51 will be etched through the insulator as required for the storage personalization and the conductors 32, 33, 48, and 49 will then be laid down on the insulating layer to have the selected conductor make contact with drain 50 through the hole 51.

While the invention has been particularly shown and described with reference to a preferred embodiment and modifications thereof, it will be understood by those skilled in the art that various other modifications in form and technical details may be made in adaptions of the invention as set out herein without departing from the spirit and scope of the invention as set out in the following claims.

What is claimed is:

1. A data storage device comprising a rectangular matrix of bit storage cells, each bit storage cell being stable in either of two storage states and comprising at least two alternatively conductive devices;

at least two power supply conductors common to said bit cells;

conductors from one of said conductive devices of each bit cell individually to either of said conductors in a preselected storage pattern;

conductors from the other of said conductive devices of each bit cell to the other power supply conductor; and connecting means to connect said power supply conductors in sequence to one side of a source of power whereby the conductive devices controlled by the first of said power supply conductors will become conductive when the other of said power supply conductors is connected to the source.

2. A storage device as set out in claim 1, and including a second pair of power supply conductors in the current return sides of said conductive devices; and means for sequentially connecting said second pair of power supply conductors to the return lead of said power source whereby said storage device can be set to a first preselected storage pattern by connecting said second pair of power supply conductors together and to said return lead of said power source and thereafter sequencing the connection of said first pair of power supply conductors to said one side of said power source or can be set to a second preselected storage pattern by connecting said first pair of power supply conductors together and to said one side of said power source and thereafter sequencing the connections of said second pair of power supply conductors to the return lead of said power source.

3. A data storage device as set out in claim 2, and including a third pair of power supply conductors also sequentially connectable to said one side of said power source;

unidirectionally conductive connections between one conductive device of each bit cell and one power supply conductor of each of said first and third pairs of power supply conductors; and other unidirectionally conductive connections between the other conductive device of each bit cell and the remaining power supply conductors.

4. A data storage device as set out in claim 1, and including a second pair of power supply conductors also sequentially connectable to said power source;

unidirectionally conductive connections between one conductive device of each bit cell and one conductor of each pair of said power supply conductors; and other unidirectionally conductive devices between the other conductive device of each bit cell and the remaining ones of said pairs of power supply conductors.

5. A data storage device for retention of changeable data in different selective storage locations and capable of being set to a comprehensive data pattern, said storage comprising a rectangular matrix of data bit storage cells, each storage cell including a pair of conductive devices settable into either of two stable states of conduction;

a pair of power supply conductors;

sequencing means for sequentially connecting said power supply conductors to one side of a source of voltage;

a unidirectionally conducting load device from one of said conductive devices to the power supply conductor which will be first connected to said voltage source;

a second unidirectionally conductive load device from the other of said conductive devices to the other power supply conductor; and control connections from each load device to a control electrode of the conductive device connected to the other load device whereby the first power supply conductor to be connected to the voltage source will condition the conduction when the second power supply conductor is connected to the voltage supply to thereby set said bit cells into a desired data storage pattern.

6. A storage device as set out in claim 5, and including at least one other pair of power supply conductors alternately with said first pair sequentially connectable to said voltage source; and other unidirectionally conductive load devices selectively connected from said conductive devices of said bit cell and said other pairs of power supply conductors, whereby the sequential connection of said other pair of power supply conductors to said voltage supply will set said bit cells into a second desired data storage pattern.

* * * * *